United States Patent [19]
Bitz

[11] Patent Number: 6,149,348
[45] Date of Patent: Nov. 21, 2000

[54] TOOL FOR BURYING HOSE

[76] Inventor: David M. Bitz, Rte. 1, Box 146C, Grey Eagle, Minn. 56336

[21] Appl. No.: 09/175,507

[22] Filed: Oct. 20, 1998

[51] Int. Cl.[7] ............ E02D 17/06; E02D 17/13; E02F 5/10; E03F 3/06; H02G 1/06

[52] U.S. Cl. ............ 405/183; 37/380; 37/403; 172/247; 172/253

[58] Field of Search ............ 405/154, 155, 405/174, 180, 183; 37/403, 404, 409, 380, 903; 172/245, 247, 253

[56] References Cited

U.S. PATENT DOCUMENTS

| 781,568 | 1/1905 | Stevens | 405/183 |
|---|---|---|---|
| 3,926,263 | 12/1975 | Frisbee et al. | 172/825 |
| 3,956,835 | 5/1976 | Evenson | 37/404 |
| 4,661,019 | 4/1987 | McLaughlin | 405/183 |
| 4,812,078 | 3/1989 | Rivard | 405/179 |
| 5,281,054 | 1/1994 | O'Riordan | 405/183 X |
| 5,913,639 | 6/1999 | Ellis | 37/403 X |

*Primary Examiner*—Eileen D. Lillis
*Assistant Examiner*—Tara L. Mayo
*Attorney, Agent, or Firm*—Gerald E. Helget; Rider, Bennett, Egan & Arundel

[57] ABSTRACT

A tool for burying a hose, cable, wire, or other elongate, flexible structure in the ground, the tool being attachable to the loader arm of a front-end loader, consisting of a support attachable to the loader arm of a front-end loader; an excavator; a bracket for attaching the excavator to the support; and an attachment connected to the excavator. The excavator penetrates the ground and creates a trench as the front-end loader is driven forward and at the same time the attachment pulls an attached hose or other structure into the trench behind the excavator.

18 Claims, 1 Drawing Sheet

U.S. Patent
Nov. 21, 2000
6,149,348
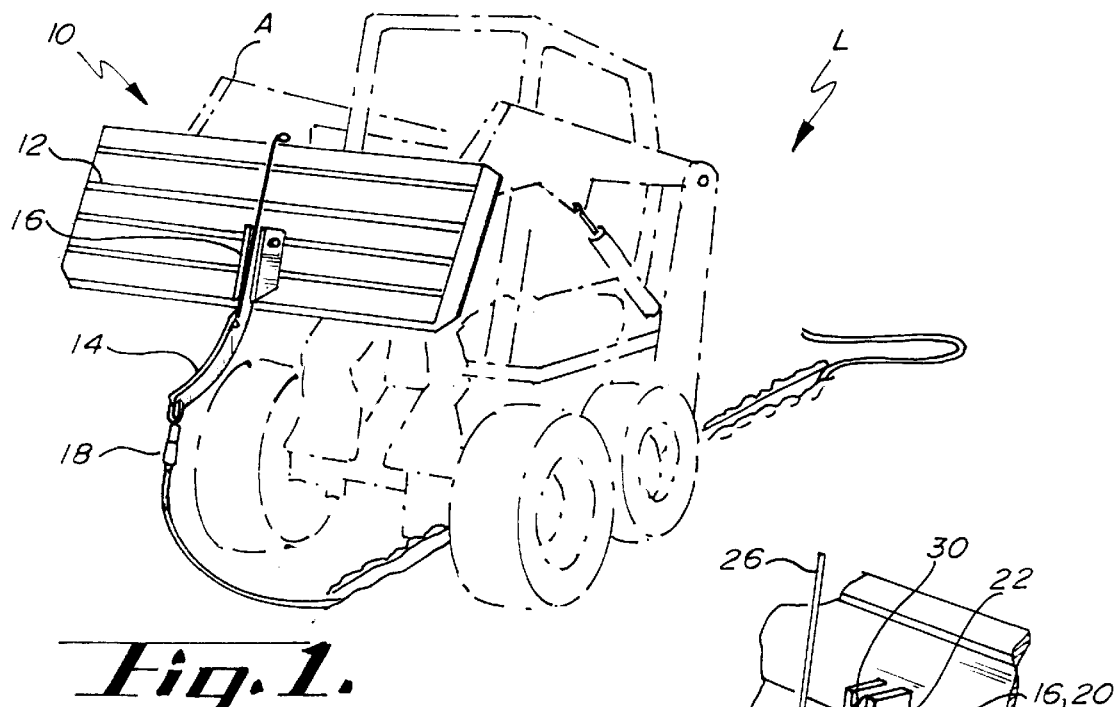
Fig. 1.
Fig. 2.
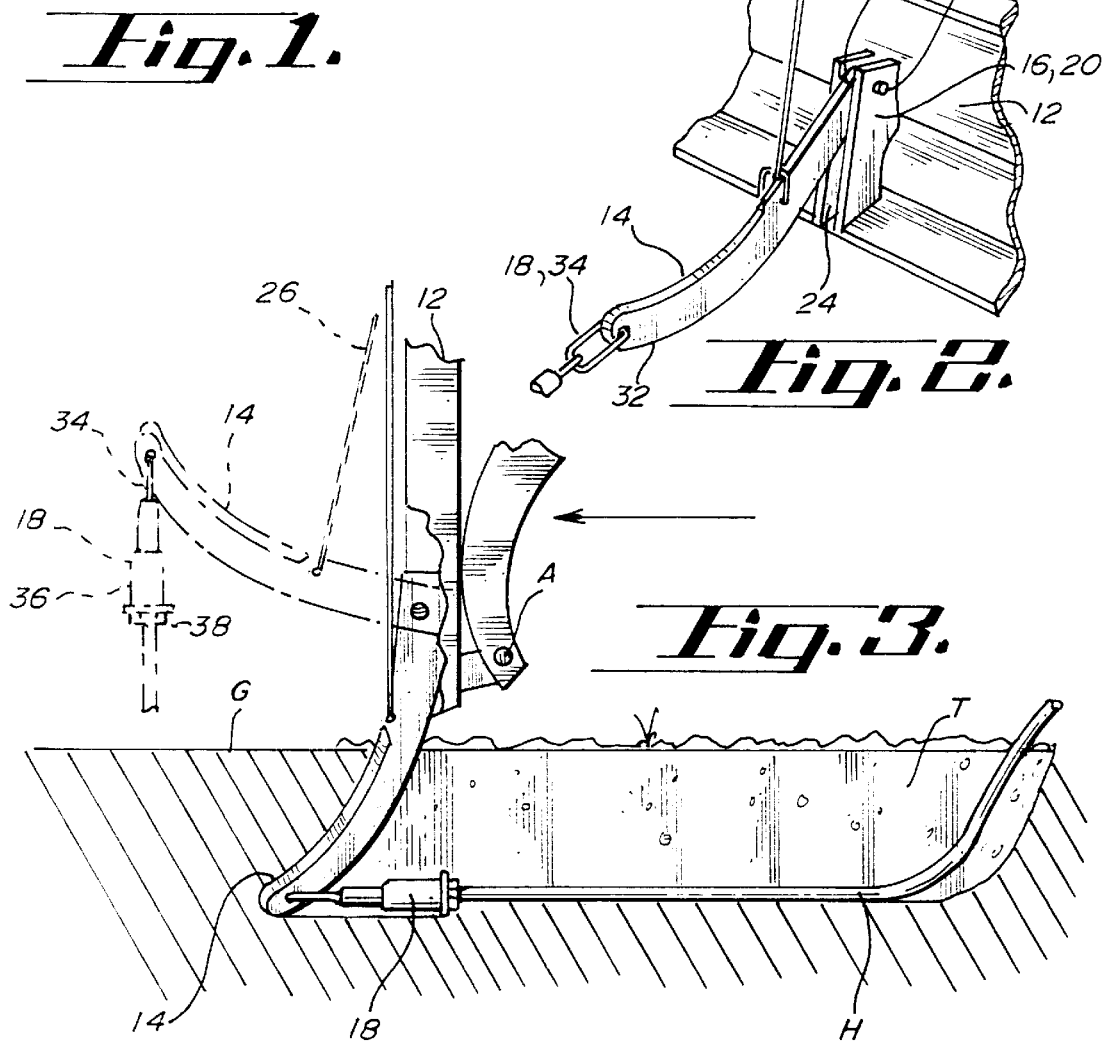
Fig. 3.

1

TOOL FOR BURYING HOSE

BACKGROUND OF THE INVENTION

This invention relates to a tool for burying a hose in the ground automatically as a trench is dug for the hose. The invention could also be used for burying other elongate, flexible structures such as a cable or wire.

Flexible hoses are buried in the ground for many reasons: to provide automatic lawn sprinkling systems, to provide a pipeline for moving product, and to keep the hose from being damaged.

In the past, burying a hose in the ground required two steps. First, a trench was excavated, generally manually with a shovel or pickaxe. The hose was then laid in the trench. Finally, the trench was filled in with dirt removed during the excavation. This process is very manually intensive and takes a lot of time to complete. Laborers may also be subject to injury due to the manual effort involved with excavating the trench and burying the hose.

There is a need for a tool that can be attached to the loader arm of a front-end loader, such as a bobcat, that will excavate the trench and automatically lay the hose in the trench as the trench is excavated.

SUMMARY OF THE INVENTION

A tool for burying a hose, cable, wire, or other elongate flexible structure in the ground, the tool being attachable to the loader arm of a front-end loader, consisting of a support attachable to the loader arm of a front-end loader; an excavator; a bracket for attaching the excavator to the support; and a hose attachment connected to the excavator. The excavator penetrates the ground and creates a trench as the front-end loader is driven forward and at the same time the hose attachment pulls an attached hose into the trench behind the excavator.

A principal object and advantage of the present invention is that it eliminates the manual labor involved in digging a trench and laying a hose in the trench.

Another object and advantage of the present invention is that the excavator can be mounted to the loader arm of a front-end loader.

Another object and advantage of the present invention is that the excavator can be pivotally mounted to the loader arm so that the excavator can be raised to a storage position when not being used.

Another object and advantage of the present invention is that the invention allows a hose to be automatically laid in a trench as the trench is excavated.

Another object and advantage of the present invention is that it creates a slit trench wherein the excavated dirt easily falls back into the trench after the hose is laid.

Another object and advantage of the present invention is that the hose attachment is removably attached to the excavator and may be manufactured in sets of various diameters, to accommodate different diameter hoses.

BRIEF DESCRIPTION OF THE DRAWINGS

FIG. 1 is a front perspective of the tool of the present invention mounted on the loader arm of a front-end loader, with the front-end loader shown in phantom.

FIG. 2 is a partial detailed perspective view of the tool of the present invention.

FIG. 3 is a side elevational view of the tool of the present invention showing the excavator penetrating the ground and laying a hose in a trench.

DETAILED DESCRIPTION OF THE PREFERRED EMBODIMENTS

The tool of the present invention is generally shown in the Figures as reference numeral 10.

The tool 10 comprises a support 12 attachable to the loader arm A of a front-end loader L; an excavator 14; means 16 for attaching the excavator 14 to the support 12; and an attachment 18 connected to the excavator 14.

As can best be seen in FIG. 3, as the excavator 14 penetrates the ground G, it creates a trench T as the front-end loader is driven forward in the direction shown by the arrow. As the front-end loader is driven forward, the attachment 18 pulls an attached hose H into and along the trench T behind the excavator 14.

In the preferred embodiment, the means 16 for attaching further comprises a bracket 20 attached to the support 12 and an excavator pivot 22 attached to the bracket 20, the excavator 14 being pivotally engaged to the excavator pivot 22, and the bracket 20 having a slot 24 for receiving the excavator 14. As seen in FIG. 3, when the excavator is in the operating position buried in the ground, the excavator enters the slot 24 so that is received within the bracket 20, thereby lending lateral support to the excavator 14 to prevent bending and breakage.

Preferably, the tool 10 further comprises a lift cable 26 attached to the support 12 and to the excavator 14, so that pulling on the lift cable 26 causes the excavator 14 to pivot toward the support 12 and releasing the lift cable 26 causes the excavator 14 to pivot away from the support 12. In this way, the excavator 14 can be raised to a storage position (shown in phantom in FIG. 3), and an operating position (shown by solid lines in FIG. 3).

In the preferred embodiment, the excavator 14 is elongate and further comprises a first end 30 attached to the support 12 and a second end 32 attached to the attachment 18, and wherein the excavator 4 is curved away from the ground G between the first end 30 and the second end 32. Alternatively, the embodiment may be described as the excavator 14 being curved convexly toward the lift cable 26. This curvature allows the excavator 14 to enter the ground substantially vertically near the support 12, while the second end 32 becomes more parallel to the ground for digging forwardly, as shown in FIG. 3.

In the preferred embodiment, the tool 10 further comprises an attachment pivot 34 pivotally connecting the attachment 18 to the excavator 14; a body 36 connected to the attachment pivot 34; and a connector 38 connected to the body. The attachment pivot 34 allows the body and connector to trail behind the excavator 14 substantially parallel to the ground surface within the trench T, as shown in FIG. 3, so that the hose H is laid along the bottom of the trench T. The connector allows the hose to be mounted to the hose attachment, preferably by a clamp.

Preferably, the connector 38 is removably attached to the body 36. In this way, different diameters of the connector 38 may be put on and removed from the attachment 18 in order to accommodate hoses H of various diameters.

Operation of the tool is as follows. The standard bucket of the front-end loader is removed and the tool 10 is attached to the loader arm A by means such as bolts, screws, welding, etc. The cable 26 is pulled upwardly so that the excavator 14 is raised to the storage position. A connector 38 appropriate to the diameter of the hose to be buried is mounted to the body 36, as by threads or equivalent means. A hose H is mounted to the hose connector 38. The front-end loader is positioned to the starting point of the trench to be excavated. The excavator 14 is lowered to the operating position, with the hose trailing along the ground behind the excavator or coiled nearby. The front-end loader is then driven forward, causing the second end 32 of the excavator 14 to penetrate the ground. As it does so, the excavator 14 swings downwardly so that it is received into the slot 24, for bracing. The excavator 14 then excavates the trench T, and the hose is pulled along behind the excavator as shown in FIG. 3, so that the hose is laid along the bottom of the trench T. Because the excavator 14 is knife like with a leading edge, the dirt falls back into the slit trench. After which, the front end loader wheels may be driven over the slit trench to completely close the trench.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A tool and a front-end loader for burying a hose, cable, wire, or other elongate, flexible structure in the ground, comprising:

(a) a loader arm on the front-end loader;
    (b) a support attached to the loader arm of the front-end loader;
    (c) an excavator;
    (d) means for attaching the excavator to the support; and
    (e) an attachment connected to the excavator and adapted to be connected to the elongate, flexible structure wherein the excavator penetrates the ground and creates a trench as the front-end loader is driven forward and wherein the attachment is adapted to pull the elongate, flexible structure into the trench behind the excavator.

2. The tool of claim 1, wherein the means for attaching the excavator to the support further comprises a bracket attached to the support and an excavator pivot attached to the bracket, the excavator being pivotally engaged to the excavator pivot, and the bracket having a slot for receiving the excavator.

3. The tool of claim 2, further comprising a lift cable attached to the support and to the excavator, whereby pulling on the lift cable causes the excavator to pivot toward the support and releasing the lift cable causes the excavator to pivot away from the support.

4. The tool of claim 1, wherein the excavator is elongate and further comprises a first end attached to the support and a second end attached to the attachment, and wherein the excavator is curved away from the ground between the first end and the second end.

5. The tool of claim 1, further comprising an attachment pivot pivotally connecting the attachment to the excavator, a body connected to the attachment pivot, and a connector connected to the body.

6. The tool of claim 5, wherein the connector is removably attached to the body.

7. The tool of claim 6, further comprising a set of connectors of various diameters selected to match the diameters of various flexible structures.

8. A tool and a front-end loader for burying a hose, cable, wire or other elongate, flexible structure in the ground, comprising:

(a) a loader arm on the front-end loader;
    (b) a support attached to the loader arm of the front-end loader;
    (c) an excavator;
    (d) a bracket attached to the support and an excavator pivot attached to the bracket, the excavator being pivotally engaged to the excavator pivot, and the bracket having a slot for receiving the excavator; and
    (e) an attachment connected to the excavator and adapted to be connected to the elongate, flexible structure wherein the excavator penetrates the ground and creates a trench as the front-end loader is driven forward and wherein the attachment is adapted to pull the elongate, flexible structure into the trench behind the excavator.

9. The tool of claim 8, further comprising a lift cable attached to the support and to the excavator, whereby pulling on the lift cable causes the excavator to pivot toward the support and releasing the lift cable causes the excavator to pivot away from the support.

10. The tool of claim 8, wherein the excavator is elongate and further comprises a first end attached to the support and a second end attached to the attachment, and wherein the excavator is curved away from the ground between the first end and the second end.

11. The tool of claim 8, further comprising an attachment pivot pivotally connecting the attachment to the excavator, a body connected to the attachment pivot, and a connector connected to the body.

12. The tool of claim 11, wherein the connector is removably attached to the body.

13. The tool of claim 12, further comprising a set of connectors of various diameters selected to match the diameters of various flexible structures.

14. A tool and a front-end loader for burying a hose, cable, wire or other elongate, flexible structure in the ground, comprising:

(a) a loader arm on the front-end loader;
    (b) a support attached to the loader arm of the front-end loader;
    (c) an excavator;
    (d) a bracket attached to the support and an excavator pivot attached to the bracket, the excavator being pivotally engaged to the excavator pivot, and the bracket having a slot for receiving the excavator, and a lift cable attached to the support and to the excavator, whereby pulling on the lift cable causes the excavator to pivot toward the support and releasing the lift cable causes the excavator to pivot away from the support; and
    (e) an attachment connected to the excavator and adapted to be connected to the elongate, flexible structure wherein the excavator penetrates the ground and creates a trench as the front-end loader is driven forward and wherein the attachment is adapted to pull the elongate, flexible structure into the trench behind the excavator.

15. The tool of claim 14, wherein the excavator is elongate and further comprises a first end attached to the support and a second end attached to the attachment, and wherein the excavator is curved away from the ground between the first end and the second end.

16. The tool of claim 14, further comprising an attachment pivot pivotally connecting the attachment to the excavator, a body connected to the attachment pivot, and a connector connected to the body.

17. The tool of claim 16, wherein the connector is removably attached to the body.

18. The tool of claim 17, further comprising a set of connectors of various diameters selected to match the diameters of various flexible structures.

* * * * *